Feb. 16, 1954  J. R. MOORE  2,669,711
RANGE MEASURING SYSTEM
Filed May 19, 1944  5 Sheets-Sheet 2

| FIG. 2. | |
|---|---|
| FIG. 3. | FIG. 4 |

*INVENTOR.*
JAMES R. MOORE.

BY *William D. Hall*

ATTORNEY

FIG. 4.

INVENTOR.
JAMES R. MOORE.
BY William D. Hall.
ATTORNEY

Feb. 16, 1954    J. R. MOORE    2,669,711
RANGE MEASURING SYSTEM
Filed May 19, 1944    5 Sheets-Sheet 5

FIG. 8.

INVENTOR.
JAMES R. MOORE.
BY William D. Hall
ATTORNEY

Patented Feb. 16, 1954

2,669,711

UNITED STATES PATENT OFFICE 2,669,711

RANGE MEASURING SYSTEM

James R. Moore, Dutch Neck, N. J.

Application May 19, 1944, Serial No. 536,263

14 Claims. (Cl. 343—13)

(Granted under Title 35, U. S. Code (1952), sec. 266)

This invention relates to a radio system for determining the location of objects and a method and means for determining slant range of objects detected by such system.

In the radio-object locating systems of this type, a pulse of ultra-high frequency is radiated by a highly directional antenna, the radiated pulse acting as an exploratory pulse of the system. If the transmitted exploratory pulse strikes an object capable of reradiating the radio frequency waves, it will be reflected in part, back to its source by this object, thus producing a radio frequency echo signal. This echo pulse, on its return to its source, may have sufficient energy to produce an observable effect in a suitable receiver located in the vicinity of the original source of the exploratory pulses. Generally the effect consists of visual indications on a cathode-ray oscilloscope in a form of vertical, upwardly projecting peaks from a horizontal time-base line. Such representation of echoes is known as class A representation. These visual indications, together with the angular position of the antenna, are utilized for determining the location of the echo-producing objects. Depending upon the number and type of the receivers used in connection with the systems of this type, it is possible to obtain azimuth, elevation, slant range, and horizontal range of the objects. The invention relates to a new method and apparatus for determining the slant range of the objects.

Generally, all radio locators determine the slant range by measuring the time interval between the transmission of the exploratory pulse and the reception of the echo signal, and converting this interval into linear distance, the two being proportional to each other because of constant, known velocity of propagation of the radio waves which is equal to the speed of light. This time interval is measured by using electrical oscillations and electrical circuits which are capable of transforming the electrical oscillations taking place during this interval of time directly into units of distance. The distance-measuring electrical circuits which are used for range determinations are, as a rule, either a phase shifter capable of giving 360° phase shift, or a resistance network, both of which may be calibrated so as to give the range distance to an echo-producing object directly in miles when the desired signal is properly positioned with respect to some appropriate reference line or a marker appearing on the screen of the range oscilloscope. In some systems the field of signals reproduced on the screen of the range oscilloscope remains stationary, and the marker signal is moved across the field until it appears directly in line with the desired signal; when this is the case, the range of the object producing the selected echo may be read directly on the dial of the phase shifter or resistance network either of which may be used for shifting the lateral position of the selected echo or of the marker on the screen of the range oscilloscope.

One of the factors limiting the accuracy of range determinations in the systems of this type is the accuracy of the electrical circuits, i. e., the phase shifter or the resistance network, which are used for measuring the time interval between the transmission of the exploratory pulse and the reception of the echo from the object under observation. Thus the accuracy of the phase shifters, which are used for shifting the phase of a sinusoidal wave instrumental in measuring the above-mentioned time interval, is ordinarily in the order of ±1.5°, or a total possible error of 3°. Thus the phase shifter may introduce considerable error in the range determinations when it is used in connection with long range radio object-locating systems. Systems have been devised which employ two phase shifters, one of which is used for shifting the phase of a fundamental sinusoidal wave, and the other for shifting the phase of a harmonic of said wave, the latter controlling the timing of the sweep circuits of the oscilloscopes, and, as a consequence, controlling the accuracy of the range determinations. The error introduced by the phase shifters in the systems of this type is reduced by a factor equal to the number of the harmonic used for controlling the oscilloscope circuits. The same type of accuracy limitations apply to the electrical devices which use resistance networks for range determinations, and, as a consequence, the resistance networks are also capable of introducing a considerable error in the range determinations when they are used in connection with long range radio object-locating systems.

The invention discloses a new method and apparatus for obtaining more accurate range determinations in connection with the long-range radio object-locating systems using resistance networks for this purpose. Two range oscilloscopes are used in connection with the range channel, one of the oscilloscopes reproducing on its screen the full range of the system, and the other oscilloscope, called high velocity oscilloscope in this specification, reproducing only a fraction or a sector of the full range. Greater accuracy of range determinations is accomplished by using a resistance network for measuring only a small portion of the range under investigation at any given time, thus reducing the possible error in the range determinations. In the prior systems, which use similar type of resistance networks for range determinations, the networks must have sufficient resistance for measuring any range from zero to full range of the system, and since the possible error increases with the distance, it follows that the error increases with the increase in range.

The invention limits this increase in error by limiting the range determination assigned to the resistance network only to a fraction, or a sector, of the total range, and by providing additional circuits for selecting the desired range sector, the latter circuits being arranged so that they do not introduce any additional error of their own into the range determinations.

To accomplish the selection of any particular range sector the system is provided with a phase shifter which enables one to select and reproduce any desired portion of the full range on the screen of the high velocity oscilloscope. Since the operation of the phase shifter does not result in the introduction of any additional errors into the range measurements, the accuracy of the range determinations, is therefore, limited only by the accuracy of the resistance network.

It is, therefore, an object of this invention to provide a method and means for determining with high degree of accuracy the range of objects by means of radio object-locating systems where range determinations are performed by means of resistance networks.

Another object of this invention is to provide a radio object-locating system equipped with a range measuring resistance network, the resistance of this network in terms of range being equal only to a fraction of the total range of the system, and the accuracy of range determinations of the system being limited only by the accuracy of the resistance network.

Another object of this invention is to provide a radio object-locating system in which higher accuracy of range determinations is made possible by providing a resistance network capable of measuring only a portion of the total range, and combining this resistance network with a phase shifter for selecting the desired portion of the total range.

Still an additional object of this invention is to provide a radio object-locating system capable of reproducing the full range of the system on the screen of one oscilloscope, and the desired portion of the full range on the screen of the other range oscilloscope with a faster sweep.

An additional object of this invention is to provide a positive synchronous operation of the transmitting and receiving channels; strict synchronism between the channels is necessary since the accuracy of all range determinations is affected by the synchronization of the two channels.

Yet another object of this invention is to provide a range measuring device which combines the range determining resistance network and a phase shifter for selecting the desired portion of the total range, said device being so constructed and arranged that the sought range reading appears as a single reading on a single dial.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which:

Figure 2 illustrates the relationship of Figs. 3 and 4 with respect to each other for their proper reading, Figures 3 and 4 are the schematic diagram of the high velocity and full range oscilloscopes, and of the range determining circuit.

For the sake of clearness the same reference characters are used in the several figures where the elements thereof are identical to the elements illustrated throughout the several figures.

Figure 1:
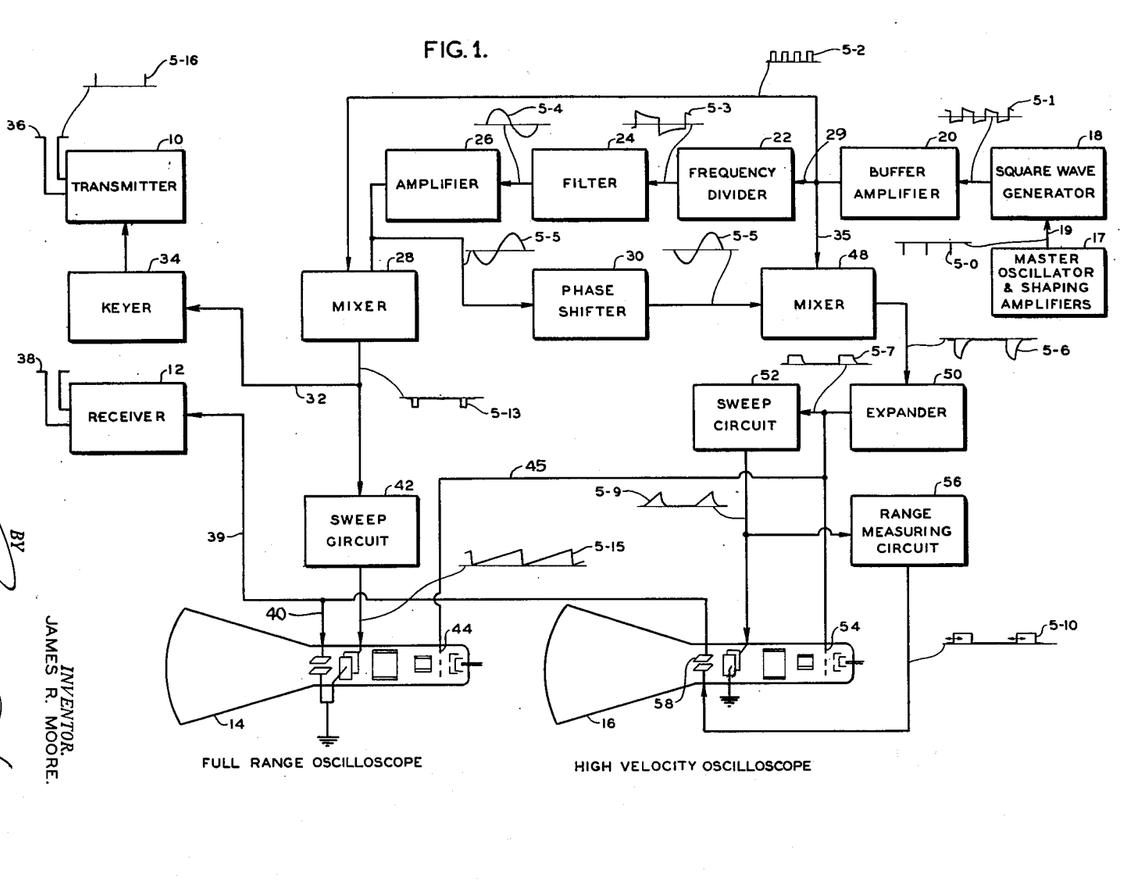
Figure 1 is a block diagram of the radio object-locating system.

Referring now to Fig. 1, a transmitter 10 appears in the upper left corner of the block diagram; a receiver 12 is positioned in line and below the transmitter-keyer combination; the full range oscilloscope tube 14 is in the lower left corner of the diagram; the high velocity oscilloscope tube 16 is to the right of the full range tube, and a master oscillator and shaping amplifier 17 which is used for synchronously operating the transmitting and the receiving channels, appears in the upper right corner of the diagram.

Proceeding now with the description of the transmitting channel, it begins at the master oscillator and shaping amplifier 17 which controls a square wave generator 18, the former generating a substantially rectangular wave 5—0 and the latter a series of pulses 5—1. Signal oscillograms shown in Fig. 1 are also illustrated in their proper time relationship in Fig. 5 where they bear the same numerals. The master oscillator is preferably of the magnetostriction type and temperature-controlled. The frequency of the master oscillator is maintained constant to improve the accuracy of all range determinations which are beyond the first sector. The sinusoidal wave generated by the master oscillator is impressed on one or several stages of the shaping amplifier which consists of overdriven vacuum tubes transforming the sinusoidal wave impressed upon them into a substantially rectangular wave 5—0. The shaping amplifiers may be omitted altogether when less accurate range determinations may be tolerated; however, more accurate timing of the square wave generator 18 may be obtained when the shaping amplifier is interposed between the master oscillator and the square-wave generator 18, so that the latter is timed by the signals having steeper wave-fronts than the sinusoidal wave.

Square wave generator 18 comprises a modified Eccles-Jordan multivibrator circuit generating rectangular pulses 5—1 which are impressed on a buffer amplifier 20, the output of which is impressed on a frequency divider 22 and mixers 28 and 48, over conductors 29 and 35 respectively. The frequency divider 22 represents a multivibrator circuit which reduces the frequency of the square wave generator 18 by an appropriate factor, such as four in an example described in this specification, so that the period of pulses 5—3 appearing in the output circuit of the frequency divider is four times longer than the period of pulses 5—1. The voltage pulses 5—3 are impressed on a filter 24 consisting of a plurality of resistance-condenser combinations which transform them into a sinusoidal wave 5—4 the period of which is equal to the period of the fundamental wave component of wave 5—3. The output of filter 24 is impressed on a sinusoidal wave amplifier 26 which impresses it on mixer 28 and a phase shifter 30. In the illustrated example, the mixer consists of a properly biased multigrid vacuum tube which suppresses the sinusoidal wave impressed on its screen grids and the rectangular pulses 5—2 impressed on its control grid except the rectangular pulses 5—2 which coincide in time of their occurrence with the occurrence of the positive maximum crests of the sinusoidal wave on the screen grid of the mixer, as illustrated at 5—12 and 5—13 in Fig. 5. Accordingly, the output of the mixer consists of a series of pulses 5—13, the periodicity of which is such that they coincide in time with the occurrence of every fourth rectangular pulse 5—2. The selected pulses 5—13 are impressed over a conductor 32 on a keyer 34 where they are transformed into keying pulses used for keying transmitter 10. Transmitter 10 transmits over a highly directional antenna array 36 a continuous series of exploratory pulses 5—16 used for detecting the position of those objects located in the field of the antenna lobe which are capable of reradiating the transmitted energy.

The reradiated energy is received by an antenna array 38 which is connected to receiver 12, the latter, after proper amplification of the received signals, impressing them over conductors 39 and 40 on the vertical deflection plates of the full range and high velocity range oscilloscope tubes 14 and 16.

The block diagram discloses two separate antennae, 36 and 38. There are systems now in use which have separate transmitting and receiving antennae, as indicated in Fig. 1, as well as the systems which use one antenna to transmit as well as to receive the signals, with a duplexing circuit interconnecting transmitter-receiver combination to the same antenna. The disclosed range determining system may function equally well with either of the two systems.

A sweep circuit 42 of the full range tube 14 is connected to the output of mixer 28, the latter controlling the timing of the sweep wave 5—15 appearing in the output of sweep circuit 42; the sweep wave 5—15 is so timed that one horizontal sweep is produced on the screen of the full range tube 14 between the successive transmitted pulses 5—16 so that the entire, full range for which the system is designed is reproduced on the screen of this tube. One of the intensity grids of this oscilloscope, i. e., an intensity grid 44, is connected over a conductor 46 to the output of an expander 50; the function and the purpose of this connection will be described later in connection with the description of the circuits connected to the high velocity tube 16.

Proceeding now with the description of circuits of the high velocity tube 16, they begin with a phase shifter 30 which is connected to the output of amplifier 26. In the example selected for illustrating more specifically the invention, phase shifter 30 is so constructed that it may produce 0°, 90°, 180°, and 270° phase shifts in the sinusoidal wave 5—5 impressed upon it by amplifier 26. Sinusoidal wave 5—5 appearing in the output of phase shifter 30 is impressed in series on an amplifier and a mixer 48, the functioning of the latter being identical in all respects to the functioning of the previously described mixer 28; it selects every fourth rectangular pulse 5—2 impressed upon it by the buffer amplifier 20, the selection being accomplished with the aid of the sinusoidal wave 5—5. The selected pulses 5—6 are expanded in an expander 50 which transforms them into a series of substantially rectangular pulses 5—7 whose flat tops are twice as wide as the width of pulses 5—2. The rectangular pulses 5—7 are impressed on a sweep circuit 52 where they control the generation of a high velocity saw-tooth wave 5—9 which is used for producing horizontal sweep in tube 16. The sweep circuit 52 is adjusted so that the duration of the linear portion of the saw-tooth wave is equal to the duration of the rectangular wave 5—7. The rectangular pulses 5—7 are also impressed on the intensity grids 54 and 44 of the cathode ray tubes 16 and 14 respectively. Normally the electron beam, because of the blocking biasing potential, does not reach the screen of tube 14 and the positive rectangular wave 5—7 is used in this tube for overcoming this blocking potential. Accordingly, only the echoes reaching the high velocity tube at this instant are reproduced on its screen. In tube 14 the rectangular pulses 5—7 make the signals reproduced on its screen at this instant appear brighter than the remaining field, thus indicating at tube 14 the range sector reproduced on tube 16.

The output of the sweep circuit 52 is also connected to a range measuring circuit 56, which has as one of its component parts the previously mentioned resistance network used for determining the range. The functioning of the range measuring circuit 56 will be described more fully in connection with the description of Figs. 3, 4, and 8. Suffice it to say at this time that it impresses a rectangular wave 5—10 on the vertical plate 58 of tube 16 thus producing a vertical step 700, Fig. 7, on a horizontal time-base line of this tube. This vertical step may be laterally displaced until it coincides with the leading edge of the desired echo signal, and when this is the case, the dial of the range measuring circuit indicates the slant range to the object producing this echo.

Figures 2, 3, 6, 7:
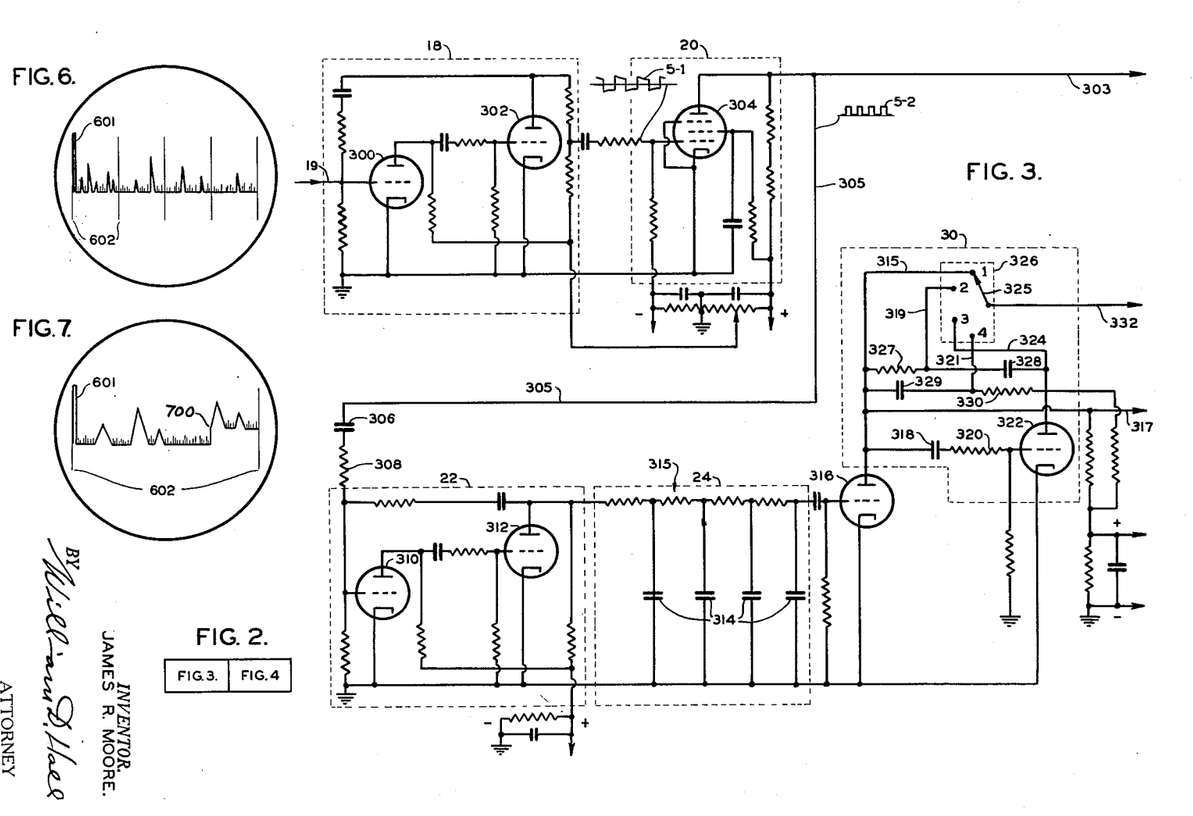

Before proceeding with the detailed description of the schematic diagrams of the range determining system, a brief functional cycle of the system disclosed in Fig. 1 will be given. From the description given thus far, it follows that the transmitting as well as the receiving channels are under continuous control of the master oscillator 17, this oscillator controlling the time intervals between the successive exploratory pulses in the transmitting channel, and proper lateral positioning of the received signals on the time-base lines of the oscilloscope tubes. The latter step is accomplished by controlling the sweep circuits of the two tubes by means of the control pulses 5—7 and 5—13, both of which are obtained by selecting every fourth pulse generated by the square wave generator 18 in the described example. The position of the horizontal base line of tube 14 remains permanently fixed, in terms of time, with respect to the transmitted exploratory pulse 5—16, since the same pulse 5—13 is used for controlling the transmitter as well as the sweep circuit 42. This tube reproduces the full range of the system, as illustrated in Fig. 6, the selected range sector being brighter than the remaining portion of the range. The brightening of one sector is produced, as it may be recalled, by impressing the rectangular pulses 5—7 on the intensity grid of tube 14. This accentuation of the desired range sector on the screen of the full range tube serves as an indication of the sector which is reproduced on the screen of the high velocity tube. No range determining means are provided in connection with the low velocity tube, because this tube is being used for the sole purpose of indicating the approximate locations and presence of the objects within the exploratory lobe of the transmitting antenna 36. The high velocity tube 16 reproduces any one-quarter of the full range, the selection of the quarter sector being accomplished by switching the phase shifter 30 into one of the four possible positions. Upon the selection of the desired sector, the range measuring circuit 56 is operated until the vertical step 700, Fig. 7, coincides with the desired echo. The range sector illustrated in Fig. 7 corresponds to the first sector 602 illustrated in Fig. 6, and vertical step 700 was made to coincide with the leading edge of an echo 702, thus determining the slant range to the object producing this echo.

Figure 4:
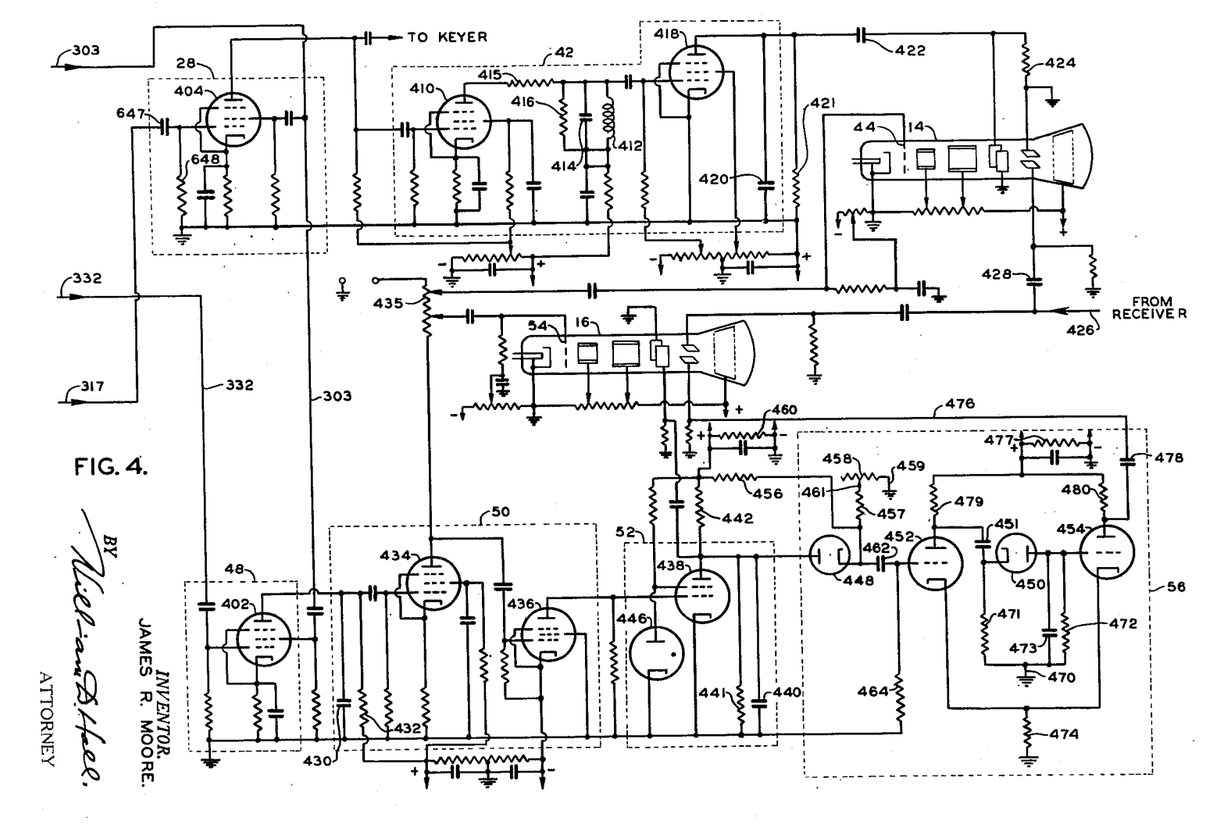

Referring now to the Figs. 3 and 4, the relationship of which with respect to each other is illustrated in Fig. 2, the upper portion of Fig. 3 shows the schematic diagrams of square wave generator 18 and buffer amplifier 20, while the lower portion of Fig. 3 shows frequency divider 22, filter 24, amplifier 26, and phase shifter 30. The magnetostriction oscillator and shaping amplifier 17 do not appear in Fig. 3, since sufficient references were previously given which fully disclose these components. Fig. 3, therefore, begins with the conductor 19 which connects the control grid of a triode 300 to the output of the shaping amplifier 17. In Fig. 4 the full range tube 14 appears in the upper right corner, mixer 28 and sweep circuit 42 in the upper central portion while the high velocity tube 16, amplifier 46, mixer 48, expander 50, sweep circuit 52, and the range measuring circuit 56 appear in the lower portion of the figure.

Proceeding now with the description of the circuits shown in Fig. 3, the square wave generator 18 comprises two vacuum tubes 300 and 302 connected in a well known multivibrator type circuit (modified Eccles-Jordan circuit) generating rectangular waves 5—1. This multivibrator is "paced" by the rectangular pulses 5—9 impressed on the control grid of triode 300 over conductor 19. The oscillograms of the signals illustrated in the Figs. 3 and 4 also appear in Fig. 5 where they are illustrated in their proper time relationship with respect to each other. The voltage wave 5—1 is impressed on a buffer amplifier pentode 304, and the latter impresses its output 5—2 over a conductor 305 and a condenser-resistance combination 306, 308 on a frequency divider 22. The frequency divider 22 consists of triodes 310 and 312 connected as a multivibrator circuit. The circuit of the triodes 310 and 312 is similar to the circuit of the triodes 300, 302 but its parameters are adjusted so as to reduce the frequency impressed upon it by a factor of four. The signals appearing in the output of this multivibrator are illustrated at 5—3. These are impressed on filter 24 consisting of a plurality of condensers 314 and resistances 315, the time constants of which are adjusted to the fundamental frequency component of the voltage wave 5—3 impressed upon them. The sinusoidal wave 5—4 appearing in the output of this filter is impressed on a lineal amplifier 316, the output of which is connected to the control grid of another linear amplifier 322. The plates of these amplifiers are connected over conductors 315 and 324 to terminals #1 and #2 respectively of a four-positioned switch 326, these terminals representing the zero and 180° phase shift positions respectively of switch 326. The plate circuits of the amplifiers 316 and 322 are also interconnected by means of resistance-condenser combinations 327—328 and 329—330, which are adjusted so that 90° and 270° phase shifts in the sinusoidal wave are obtained at terminals #2 and #3 of the phase shifter switch 326, the phase shifts being measured with respect to the zero phase shift sinusoidal wave 5—5 appearing at the #1 terminal of the switch. A rotatable arm 325 of phase shifter switch 326 is connected over a conductor 332 to a mixer pentode 402, the function of which will be described later in connection with the description of the circuits connected to the high velocity oscilloscope tube 16. Phase shifter 30, Fig. 1, therefore, consists of the triodes 316, 322, the resistance-condenser combinations 327—328, 329—330, and four-position switch 326, the resistance-condenser combinations remaining fixed once they have been adjusted to produce the 90° and 270° phase shifts. The description of the operating cycle of the radio locator will reveal the fact that, although the phase shifter is indispensable in 75% of all range determinations, it does not affect the accuracy of the range determinations.

The sweep circuit of the full range tube 14 begins with a pentode 404 in Fig. 4, which corresponds to mixer 28 illustrated in Fig. 1. The screen grid of pentode 404 is connected over conductor 303 to the output of the buffer amplifier 304 so that the pulses 5—2 are impressed on the screen grid of this tube. The control grid of pentode 404 is connected over a conductor 317 to the output of the sinusoidal wave amplifier 316. The combination of signals impressed on the control grid and screen grid of pentode 404 is illustrated at 5—12, and the signals appearing in its plate circuit are illustrated at 5—13. The pentode is so biased that all signals except the rectangular pulses which coincide with the positive crests of the sinusoidal wave are incapable of overcoming the blocking potential of the pentode, thus rendering it periodically conductive, as illustrated by the negative voltage waves 5—13.

The negative pulses 5—13 are impressed on the control grid of a shaping amplifier 410, the plate circuit of which is equipped with an inductance 412, a condenser 414, and a resistance 416, inductance 412 being the element of this network which controls in the main the form of the signals impressed on the control grid of the sawtooth generator 418. The plate current variations of pentode 419 have a substantially rectangular wave form which through inductance produce sharp peaks of voltage 5—14 across the coil 412, the maximum voltage being produced when the rate of change of current is greatest. During the time represented by the flat portion of the current wave, no voltage is developed in the inductance, and the voltage pulse is reversed when the rate of change of current reverses its sign. Therefore, the voltage waves appearing across inductance 412 consist of a series of positive and negative pulses 5—14.

The other circuit elements of the pulse-generating network are the R. F. by-pass condenser 414 and the damping resistance 416. The capacitance of condenser 414 is much too low to resonate inductance 412 to the frequency of the pulses 5—13. To prevent this resonant circuit from oscillating because of the occasional shock excitation provided by the pulses 5—13, it is shunted by the damping resistance 416. Resistor 415 limits the value to which saturation current rises and so limits the shock excitation to the inductance-capacitance circuit with which it is in series. The voltage drop across the resistor 415 is not applied to the grid of the saw-tooth generator tube 438.

The saw-tooth wave generator 418 is biased beyond cut-off so that it is affected only by the positive peaks of the driving voltage 5—14. The saw-tooth generating condenser 420 being charged slowly through a resistance 421 accumulates its usual charge resulting in the generation of the saw-tooth voltage wave 5—15. When the positive peaks of the driving voltage 5—14 appear on the control grid of pentode 418 it is rendered fully conductive, thus discharging condenser 420. The saw-tooth wave 5—15 is impressed in conventional manner by means of a condenser 422 and a resistance 424 on the horizontal deflection plates of tube 14. The discharge time of condenser 420, which represents the return cycle of the electron beam, is so short that it is usually not discernible on the screen. Several sweep amplifying stages, which are ordinarily interposed between condenser 420 and cathode tube 14, are not illustrated in Fig. 4. The vertical plates of the tube are connected in conventional manner to the output of receiver 12, Fig. 1, over a conductor 426 and a coupling condenser 428. The same type of coupling also exists between the vertical plates of the high velocity tube 16 and the receiver.

Figure 5:
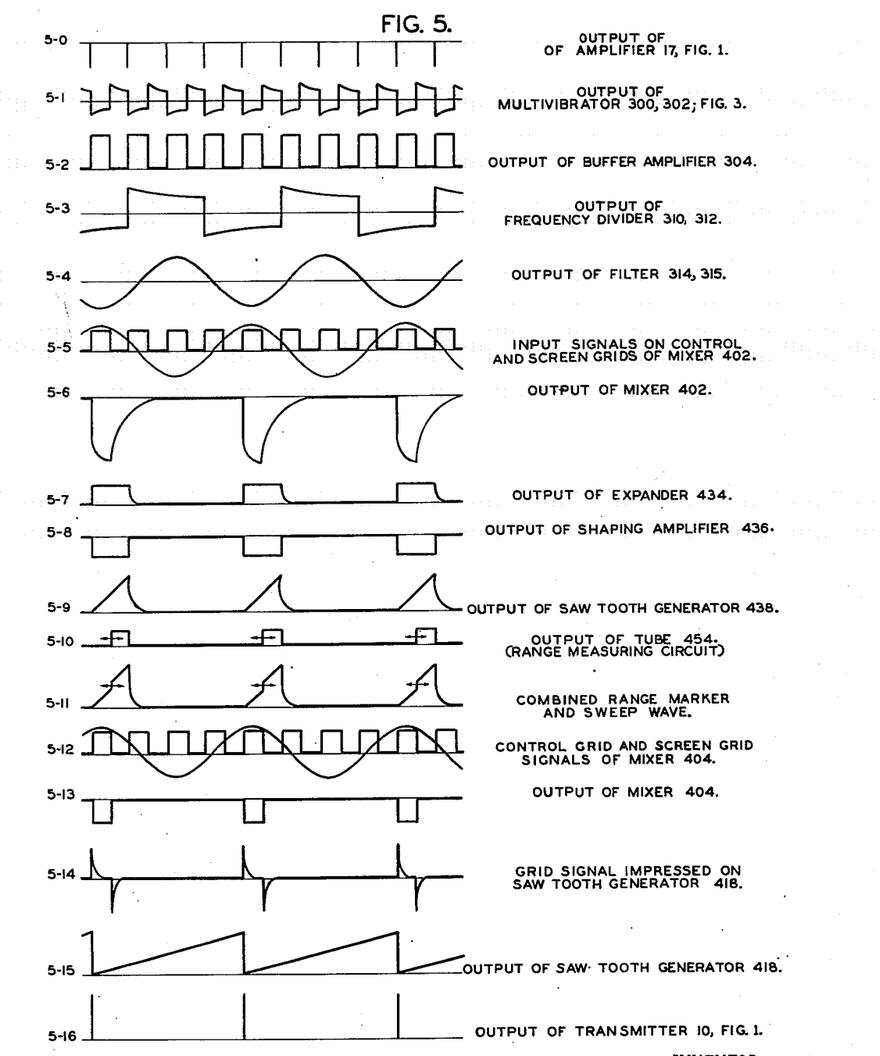
Figure 5 illustrates the oscillograms of signals appearing in the circuits disclosed in Figs. 1, 3, and 4, Figures 6 and 7 illustrate typical signal patterns appearing upon the screens of the full range and high velocity oscilloscopes respectively.

From the description of the circuit of the full range tube, and the time relationship of the signals illustrated in Fig. 5, one may readily see that the generation and timing of the saw-tooth wave 5—15 is under continuous control of the leading edges of every fourth rectangular pulse 5—2 selected by mixer 404, the latter transforming them into the pulses 5—13. It is to be noted that the above mentioned leading edge of the rectangular pulse does not initiate the charging period of the condenser, but is used for generating strong, driving pulses 5—14, the positive peaks of which are used for discharging the saw-tooth generating condenser 420. Because of the low impedance offered by pentode 418 when it is rendered fully conductive by the pulses 5—14 the discharge period of the condenser 420, as mentioned previously, is extremely rapid and takes place during the transmission of the exploratory pulse 5—16. Depending upon the timing of the circuits of the transmitter and the length of the exploratory pulse, it may or may not appear on the screen of the low velocity tube. If the duration of the exploratory pulse is relatively long, the lagging portion of it, 601, Fig. 6, may appear at the extreme left portion of the horizontal sweep. Irrespective of the parameter of the circuits of the transmitter and of the saw-tooth wave generator 418, the non-appearance or the appearance of the transmitted pulse 601 on the screen of the full range tube 14 has no detrimental effect on the operation of the radio locator since the full range tube is used only for the reproduction of the full range field rather than actual range determinations. Accordingly, the only requirement that must be satisfied in connection with the full range channel resides in the fact that all echoes appearing directly after the exploratory pulse are faithfully reproduced on the screen of the full range tube.

The high velocity tube channel begins with mixer 402, the screen grid of which is connected over conductor 313 to the output of the buffer amplifier and the rectangular pulses 5—2. The control grid of mixer 402 is connected over a conductor 322 to the adjustable arm 325 of the four-position switch 326, this connection impressing the sinusoidal wave on this grid. The phase of the impressed sinusoidal wave is determined by the particular position of the adjustable arm 325 on the four contacts of the switch. The combined signals impressed on the control and the screen grids of pentode 402 are illustrated at 5—5. Examination of the phase relationship between the sinusoidal waves 5—4 and 5—5 indicates that the adjustable arm 325 is making contact with #1 terminal since there is no additional phase shift introduced between the sinusoidal waves 504 and 505 except the usual phase inversion which takes place between the input and the output circuits of a vacuum tube. As in the case of the previously described mixer 404, mixer 402 is so biased that only the rectangular pulses which coincide with the positive crests of the sinusoidal waves render mixer 402 conductive. Because of the relatively large time constant of the resistance-condenser combination 430—432 the rectangular pulses selected by mixer 402 appear as distorted signals 5—6, and these are impressed on an expander-amplifier pentode 434. Pentode 434 is normally fully conductive, and the negative signals 5—6 overdrive it in the negative direction so that the positive voltage signals appearing at its plate are substantially rectangular voltage pulses 5—7. The amplitude as well as the degree of distortion produced by the R-C network 430—432 are such that the distorted signals 5—6 render pentode 403 fully non-conductive for a period equal to the period of the rectangular pulse 5—2, as illustrated in Fig. 5. The substantially rectangular pulses 5—7 are impressed on an inverter-amplifier pentode 436 which reverses the sign and improves the form of the driving signals by converting them into substantially rectangular pulses 5—8. These are impressed on the control grid of a tetrode 438 which, together with a condenser 440 and resistances 441 and 442, acts as a saw-tooth generator. Resistance 441 is used for regulating the waveform of the saw-tooth wave generated by condenser 440.

Tetrode 438 is so biased that it is normally fully conductive, thus keeping condenser 440 normally in discharged condition. To impart the necessary stability to the saw-tooth generator circuit during these long conductive periods, the screen grid of tetrode 438 is connected to ground through a voltage regulator gas-filled tube 446. Since the high velocity tube 16 is used for all range determinations, and the range measuring circuit is connected and controlled by the saw-tooth wave 5—9, the starting point of the horizontal sweep, which is the plate potential of tetrode 438, must remain constant during the conductive periods of this tube. To improve the stability of tetrode 438 its screen grid is "clamped down" by the voltage regulator 446.

The negative rectangular wave 5—8 impressed on the control grid of tetrode 438 renders it nonconductive, and during this non-conductive period the saw-tooth generating condenser 440 has its charging period thus generating a sawtooth wave 5—9. The duration of the linear portion of the saw-tooth wave 5—9 is equal to the period of the rectangular wave 5—2, and it is this mode of timing of the saw-tooth generator that enables one to reproduce on the screen of the high velocity tube 16 only one quarter of the full range. It may be recalled that the duration of the linear portion of the saw-tooth wave 5—15, which acts as the full range base line, is equal to the four periods of the rectangular wave 5—2; similarly, the transmitted pulses 5—16 are spaced four rectangular pulses apart.

The intensity grid 54 of tube 16 is connected to a rheostat 435 generating the positive rectangular voltage wave 5—7. Tube 16 is normally so biased that none of the signals are reproduced on its screen, and it is only during the appearance of the positive voltage wave 5—7 on its intensity grid 5—4 that it is capable of reproducing any echo signals. The same type of connection, but at a lower point on the rheostat, exists between the intensity grid 44 of tube 14 and potentiometer 435, this connection intensifying the brightness of the selected sector 602, Fig. 6, on its screen.

The range measuring circuit itself consists of diodes 448, 450, triodes 452, and 454, and a potential divider circuit 456, 457, and 458. A more detailed description of a preferred form of potential divider circuit may be found in a patent application Ser. No. 470,413 of James R. Moore titled "Resistance Network" and filed on December 28, 1942, now Patent No. 2,423,463, issued July 8, 1947. A source of positive potential 460 is connected to ground 459 through the potential divider, and to the cathode of diode 448 through the fixed resistance 456.

The plate of diode 448 is also connected to the positive source of potential 460 through a plate resistor 442. When condenser 440 begins its charging period, diode 448 is non-conductive since the positive potential impressed on its cathode over resistance 456 is higher than the potential appearing at the upper plate of condenser 440, which is at approximately ground potential when tetrode 438 is fully conductive. However, when tetrode 438 is rendered non-conductive, and as the potential across condenser 440 begins to exceed the potential impressed on the cathode of diode 448 through resistor 456, diode 448 becomes conductive and remains conductive until the negative potential impressed on the control grid of tetrode 438 is removed at the lagging edges of the rectangular waves 5—8, and condenser 440 begins to discharge across tetrode 438. At this instant the potential impressed on the plate of diode 448 drops again to a very low value, and diode 448 becomes non-conductive once more. The instant when diode 448 becomes conductive may be varied by varying the setting of the rheostat arm 461. When this arm is set near ground 459, diode 448 becomes conductive with the beginning of the charging period of condenser 440. Conversely, when the potentiometer arm 461 is moved to the left, and nearer to the source of the positive potential 456, there is a delay period between the time condenser 440 begins its charging period and the instant diode 448 becomes conductive. Diode 448 is connected through a condenser 462 and a resistance 464 to the control grid of a triode 452 thus controlling its conductivity. The cathodes of the triodes 452 and 454 are connected to ground through a common cathode resistor 474, and the plate of triode 452 is connected to the cathode of diode 450 through a coupling condenser 451. The cathode and the plate of diode 450 are connected to ground at 470 through resistors 471 and 472 respectively, and resistor 472 is shunted by a condenser 473. The control grid of triode 454 is connected to the plate of diode 450. The plates of the triodes 452 and 454 are connected to a source of positive potential 477 through their respective plate resistors 479 and 480. The plate of triode 454 is connected to the vertical plates of the high velocity tube 16 in conventional manner through a coupling condenser 478 and a conductor 476. Conductor 476 may be connected either to the vertical or horizontal plates of the oscilloscope, depending upon the desired type of marker indication.

With no negative rectangular wave 5—8 impressed on tetrode 438, triodes 452 and 454 are equally conductive, their cathodes being connected to ground 474 their plates to the common source of positive potential through the equal resistors 479 and 480, and the grids grounded through the grid resistors 464 and 472, the condensers 462 and 473 exerting no influence on the respective control grids at this time. At this instant condenser 462 is charged to a steady state potential determined by the setting of the potentiometer arm 461. When diode 448 is rendered conductive, condenser 462 becomes connected to a higher positive potential through diode 448 and there is an instantaneous surge of charging current into condenser 462 through grid resistor 464 which renders the control grid of triode 452 more positive and triode 452 more conductive. This results in such a lowering of potential impressed on the cathode of diode 450, connected between the plate of triode 452 and ground 470, that it is rendered conductive. The R-C networks 471—451 and 472—473 of diode 450 keep it conductive for the remaining portion of the saw-tooth wave. When diode 450 is rendered conductive, it impresses a negative potential on the control grid of triode 454 rendering triode 454 nonconductive. The negative potential impressed on the control grid of triode 454 and the resistance drop across resistance 474 keep triode 454 nonconductive as long as triode 452 is conductive. When diode 448 is rendered nonconductive, which takes place during the discharge period of condenser 440, triode 452 is rendered momentarily nonconductive, because at this instant condenser 462 adjusts itself to a lower potential impressed upon it across a circuit composed of ground 459, rheostat 458, resistor 457, condenser 462, and grounded resistor 464. During this instant the excess of electrons on the right plate of condenser 462 leaks off through resistor 464, rendering triode 452 momentarily nonconductive. The time constant of the condenser 462 is very small so that condenser 462 is capable of adjusting itself to the steady state potential very quickly. It should be noted that this adjustment period of condenser 462 coincides in time with the return cycle of the cathode ray beam in tube 16, which is suppressed by the intensity grid 54. When triode 452 becomes nonconductive, and after capacitor 473 has discharged through resistor 472, triode 454 becomes conductive since there is momentarily no potential drop over resistance 474 and the negative potential impressed on its grid is removed after condenser 473 discharges to ground through resistor 472. When this is the case, the control grid of triode 454 and its cathode are both at ground potential, and triode 454 is rendered conductive. During this brief period diode 450 acts as decoupling means between the plate of triode 452 and the grid of triode 454.

When condenser 462 assumes once more its steady state potential, the triodes 452 and 454 become equally conductive again, as described previously. The cycle repeats itself with the repetition of the charging and discharging cycles of condenser 440.

From the description of the range-determining circuit, it follows that the setting of the potentiometer arm 461 determines that instant of time when triode 454 is rendered nonconductive, thus generating the rectangular voltage wave 5—10 in its plate circuit. It is this positive voltage wave that is impressed either on the horizontal or the vertical plates of the high velocity tube 16 over conductor 476, thus producing the vertical step 700, Fig. 7. The resultant signal impressed on the horizontal plates of tube 16 when conductor 476 is connected to the horizontal plate is shown at 5—11 in Fig. 5. As indicated by the double-headed arrows at 5—10 and 5—11, the time of occurrence of the leading edge of the rectangular wave 5—6 may be varied, so that this marker step may take place at any time along the linear portion of the saw-tooth wave 5—9, this variation being obtained by varying the setting of the potentiometer arm 461. It thus may be aligned with any echo, and when this is accomplished, the rheostat setting at once gives the slant range distance in linear units to the object producing the selected echo.

This type of range determining circuit is being claimed in my copending application, Serial No. 467,261, filed November 28, 1942, which discloses another species of this type of circuit.

One of the factors influencing the accuracy of range determinations is whether step 700 is produced with such speed that it appears as a vertical or as a slanting line on the screen. Since the vertical step may be aligned more accurately with an image of an echo than the slanting step, it becomes very desirable for it to be vertical. This is the case because of the action of the diodes 448 and 450, cathode resistor 474, and the amplifying action of the triodes 452 and 454. When diode 448 is rendered conductive, there is a very rapid rise in the grid potential of triode 452 and simultaneously rapid rise in the conductivity of triode 452. This rise in the conductivity of triode 452 is accentuated by the fact that triode 454 is rendered nonconductive because of the instantaneous IR drop in the grid resistor 472. When triode 454 is rendered nonconductive, it reduces the IR drop across resistance 474, thus depressing the cathode of triode 452. This results in the regenerative action between the triodes 452 and 454, the former becoming fully conductive and the latter fully nonconductive. For these reasons, triode 454 may be considered to become nonconductive instantaneously, and the step 700 actually appears as a vertical step on the screen of tube 16 in spite of the fact that tube 16 uses the high velocity sweep.

It should be noted that when diode 448 becomes conductive, the time constant and the effective resistance of the charging circuit of condenser 440 will have a slightly different value than during its initial charging period, the latter being controlled solely by the resistances 442 and 441. When diode 448 becomes conductive, the parameter of the charging circuit changes, and this may produce a slight change in the rate of charging condenser 440. This change, however, will not alter the accuracy of any range determinations because all range determinations are controlled by the condition of the circuits during the period of time which precedes this change.

It has been previously mentioned in the specification and in the objects of invention that the accuracy of range determinations is not affected by the error produced by the phase shifter. When all range determinations are performed by means of phase shifters, the phase shifters must of necessity be an adjustable type so that smooth, continuous phase displacement may be obtained from 0° to 360°. It is this type of phase shifter that has an accuracy of approximately ±3%. In the disclosed system the phase shifter is of step-by-step type, and in the specific example only 0°, 90°, 180°, and 270° phase displacements are available. These steps may be adjusted so as to give much greater accuracy than ±3%. Accordingly, while the error in shifting phase of the sinusoidal wave 5—4 by the phase shifter 30, Fig. 1, is much less than 3%, even if one is to assume that, because of instability of the components of the phase shifter, there is an error as large as 6%, even then this error will not affect the accuracy of the range determinations since the accuracy depends solely on the accuracy of the potentiometer circuit 456, 457. That this is actually the case may be perceived from examination of the signals illustrated in Fig. 5. The range measuring circuits, the sweep, and the transmitter circuits are all timed and controlled either by the pulses 5—6 or 5—14, and the timing of these pulses is not affected by any slight changes in the timing or phasing of the sinusoidal waves 5—5 and 5—12. The signals illustrated at 5—5 and 5—12 are impressed on the mixers which are so biased that only the rectangular pulses which coincide with the positive crests of the sinusoidal waves get through the mixers, the remaining signals being suppressed. It is apparent that so long as the timing of the sinusoidal waves is only approximately correct, proper rectangular pulses will be selected, and, since the subsequent control of the circuits is all accomplished by the leading edges of the selected rectangular pulses, the errors produced by the phase shifter will have no effect on the range determinations. This may also be apparent from the connections illustrated in Fig. 1, where the output of buffer amplifier 20 is connected to mixer 28 over conductor 29, and to mixer 48 over conductor 35. The rectangular pulses 5—7 impressed on these mixers will be selected by the mixers irrespective of slight changes in phase of the sinusoidal waves, also impressed on the mixers, so long as the mixers are properly biased, and so long as the amplitude of the rectangular pulses 21 is sufficiently high to overdrive the mixers even when the screen grid voltages change slightly because of minor variations in the phase of the sinusoidal waves.

Figure 8:
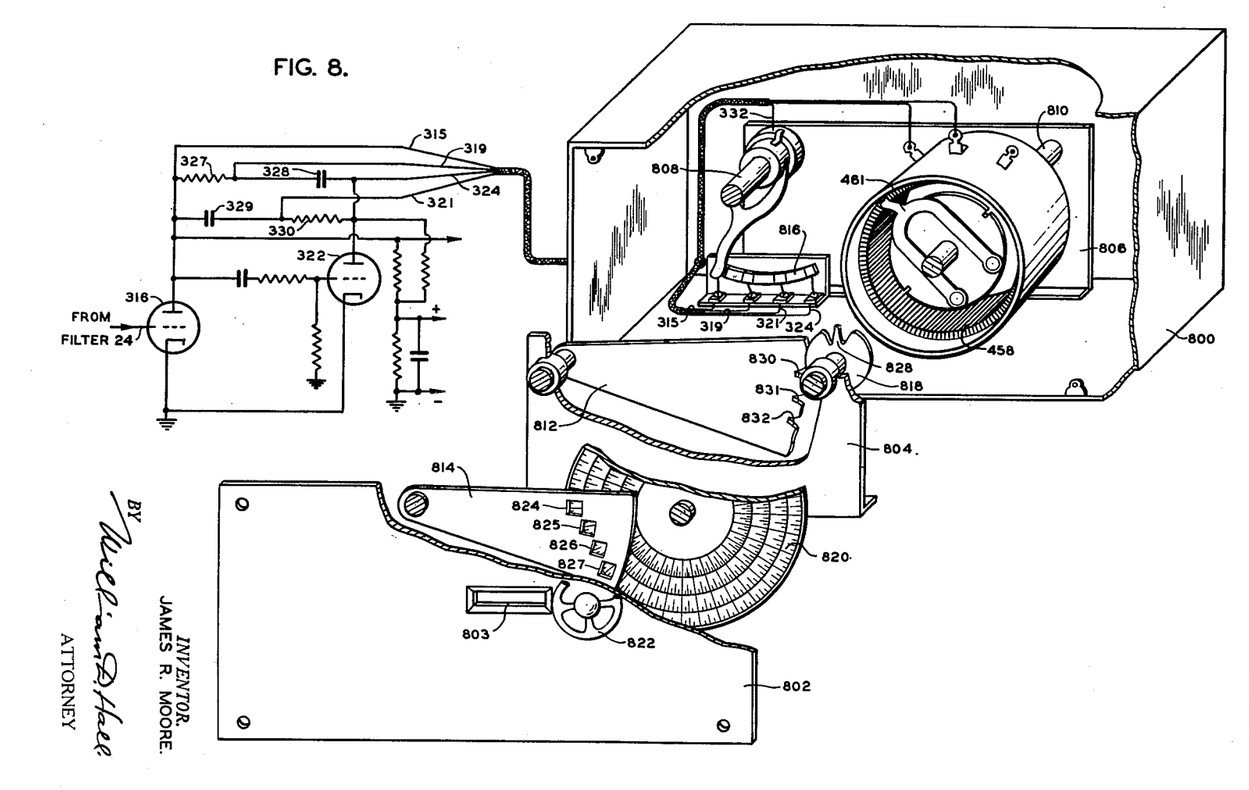
Figure 8 is an exploded isometric view of some of the elements of the phase shifter and the resistance network used for determining range.

Referring now to Fig. 8, it discloses one type of mechanical connection between the phase shifter 30, Fig. 1, and the range measuring circuit 56, which enables one to obtain all range readings on one dial irrespective of the setting of the phase shifter. The advantage of such arrangement is that the probability of obtaining erroneous range readings is reduced to a minimum since the range reading appears on a single dial as a single, complete range reading, and the range operator does not have to pay any attention to the setting of the phase shifter. The arrangement consists of a metal box 800 provided with a cover 802, the latter being equipped with a slit 803. Two brackets, 804 and 806, are mounted on the lower panel of box 800, these brackets acting as mechanical supports for shafts 808 and 810. Rigidly attached to shaft 808 are the phase shifter arm 325, a Geneva gear sector 812, and a range dial scanning shield 814. The phase shifter arm 325 is connected to conductor 332 and makes contact with a commutating segment 816, which is equipped with four metal contacts #1, 2, 3, and 4. These correspond to the similarly numbered contacts of the phase shifter switch 326 illustrated in Fig. 3. The four wires 315, 319, 321, and 324 correspond to the similarly numbered conductors in Fig. 3 which connect the four-position switch 326 to the triodes 316, 322 and resistance-condenser combinations 329–330 and 327–328 interconnecting the plate circuits of these triodes. Accordingly, segment 816 and arm 325 represent the phase shifter switch 326 illustrated in Fig. 3.

The rheostat arm 461, which corresponds to the similarly numbered rheostat arm of the range measuring circuit shown in Fig. 4, is rigidly connected to shaft 810. Also rigidly connected to shaft 810 is a gear 818 which represents the driving gear of the Geneva intermittent motion arrangement interconnecting the shafts 810 and 808. A range wheel 822, also rigidly connected to shaft 808, is used for aligning the vertical step 700, Fig. 7, with the desired echo. The rheostat arm 461 makes contact with the rheostat 458, which corresponds to the similarly numbered rheostat in Fig. 4 used for the actual range determinations. In the position illustrated in Fig. 8, the scanning shield 814 is positioned so that its scanning perforation 824 is in line with slit 803 and the outer scale appearing on the range dial disc 820; this scale is calibrated from zero to 50 miles, should the full range of the system be equal to 200 miles. The succeeding scales of disc 820 are calibrated respectively to give range readings from 50 to 100, 100 to 150, 150 to 200 miles, and the scanning sector 814 is provided with the additional three perforations 825, 826, and 827. These perforations become positioned in line with their respective scales and slit 803 when the range wheel 822 is turned sufficient number of revolutions to accomplish this result.

When the clockwise-rotated driving gear 818 engages with its tooth 828 a recess 830 of sector 812, the latter is turned through a limited angle in a counter-clockwise direction, turning shaft 808, scanning sector 814, and the phase shifter arm 325 through the same angle. Phase shifter arm 325 now makes contact with #2 terminal, while the scanning sector 814 aligns perforation 825 with the slit 803, thus obliterating all range scales except the range scale from 50 to 100 miles. The same type of intermittent turning of shaft 808 takes place when driving gear 818 reaches recesses 831 and 832, thus successively turning the range arm from #2 terminal to #3 and #4 terminals. Upon reaching the maximum range, the range determining assembly may be returned again to its original zero range position by turning the range wheel 822 in a counter-clockwise direction.

The advantages of the arrangement illustrated in Fig. 8 reside in the fact that the shafts 810 and 808 are interconnected through the intermittent motion Geneva gears 818 and 812 which enable one to align the desired scale with the perforations of sector 814 and slit 803 and obliterate all other scales, thus positively preventing any confusion which could otherwise exist. Moreover, the range-determining rheostat 458 and the phase shifter arm 325 are operated by the same wheel 822, the operation of these elements being so synchronized that the phase shifter arm is turned to the next terminal upon the completion of the effective turn of the rheostat arm 461. The rheostat 458 is so wound that one of its sectors, at the end of the rheostat, is provided with a low resistance conductor which does not produce any change in the resistance setting. This sector, as well as the potentiometer arm 461, is aligned with the tooth 828 of the driving gear 818, so that when tooth 828 begins to turn shaft 808, the rheostat arm 461 travels along the low resistance conductor, then connects this conductor to ground by bridging the gap between the two extremes of the rheostat, and finally finds itself positioned at the zero resistance position of the rheostat. Thus a smooth transition from one selected sector to the next is obtained without any undue disturbance of the range measuring circuits connected to this rheostat.

The operation of the system should be apparent from the description given thus far, and for this reason, only a brief summary of its functional cycle will be given here. The entire field scanned by the transmitted exploratory pulses 5—16 continuously appears on the screen of the full range oscilloscope tube 14. The operator chooses the desired sector for its reproduction on the screen of the high velocity oscilloscope by observing the position of the desired echo on the screen of the full range oscilloscope. The screen is provided with the sector markings so that the operator is at once in a position to determine the number of the sector in which the selected echo lies. The selection is performed by operating wheel 822 of the range measuring circuit, the selection being at once indicated on the screen of the full range oscilloscope by brightening of the images of the echo signals which appear in the selected sector. After this selection of the desired sector the operator adjusts the rheostat arm 461 of the range measuring circuit which aligns the vertical step 700 with the image of the selected echo on the screen of the high velocity tube. The range reading may then be obtained by noting the reading of dial 820.

From the description of the radio object-locating system, and particularly the method and apparatus for determining slant ranges of the object detected by this system, it should be apparent that it offers definite advantages since it enables one to make range determinations with a much greater accuracy than it has been possible heretofore with the systems of this type. The invention has been illustrated and described in connection with the system where the ratio between the frequencies of the waves generated by the square wave generator 18 and the sinusoidal wave appearing in the output of filter 24 is 4 to 1 ratio. The accuracy requirements, as a rule, are very well satisfied when this ratio of frequencies is used, but it is obvious that the system is not limited to that specific ratio, and when the accuracy of range determinations may be either lower or higher, the above frequency ratio may be changed to conform with the sought results. When higher accuracy is desired the frequency of the master oscillator must be increased with the frequency of the frequency divider remaining constant.

It should be noted that while in the schematic diagram shown in Figs. 3 and 4 some specific circuits were illustrated which perform the necessary functions, it should be obvious to those skilled in the art that these specific circuits may take different, known forms; for example, the frequency divider circuit and the filtering arrangements illustrated in Fig. 3 may be replaced with the shock excited oscillators, or many other frequency reducing circuits which are capable of performing the same function. The same is true of the sweep channels for the high and low velocity oscilloscope tubes, the circuits used for this purpose may be replaced with other well-known sweep generating circuits which perform the intended function with equal effectiveness. When the generated saw-tooth waves possess high degree of linearity, the resistance network 458 may be an ordinary linear rheostat. The multivibrator circuit 300—302 may be of that type where both tubes are controlled by the signals from the master oscillator.

It is believed that the construction and operation of the radio locator and range determining circuits will be apparent from the foregoing description. It will, therefore, be apparent that while I have shown and described my invention in one preferred form, many changes and modifications may be made without departing from the spirit of the invention, as sought to be defined in the following claims.

I claim:

1. A receiving channel in a radio object-locating system, said receiving channel including a master oscillator, a frequency dividing circuit connected to said master oscillator, a filter connected to the output of said frequency dividing circuit and adjusted to the fundamental wave of said frequency dividing circuit whereby its output is a substantially sinusoidal wave, an amplifier and a phase shifter connected to the output of said filter, and a mixer connected to said master oscillator and said phase shifter, said mixer selecting only that series of pulses generated by said master oscillator which coincide in time with the positive crests of the wave impressed on said mixer by said phase shifter, and a multicontact switch interposed between said phase shifter and said mixer for selecting the phase of said sinusoidal wave, said phase positions differing from each other by steps corresponding to a 360° phase shift of the wave generated by said master oscillator.

2. A radio object-locating system including a receiver, a full range oscilloscope and a high velocity oscilloscope connected to said receiver, a series circuit including a master oscillator, a shaping amplifier, a square wave generator synchronized with said master oscillator, a frequency divider, a filter tuned to the fundamental frequency of said divider, an amplifier, a phase shifter and a mixer; said mixer being also connected to said square wave generator whereby said mixer is rendered conductive by a selectable series of pulses generated by said square wave generator, the selected series being determined by the setting of said phase shifter, an expander connected to said mixer, a sweep generating circuit connected on its input side to said expander and on its output side to said high velocity oscilloscope, said sweep circuit being synchronized with said master oscillator through said series circuit, expander and mixer, a range-measuring circuit connected on one side to said sweep circuit and on the other side to said high velocity oscilloscope, said range-measuring circuit generating an adjustable marker signal; a second mixer connected to said amplifier and to said square wave generator, said second mixer selecting a fixed series of pulses generated by said square wave generator, a pulse-shaping amplifier connected to said second mixer, and a second sweep-generating circuit connected on its input side to said pulse-shaping amplifier and on its output side to said full range oscilloscope.

3. A radio object-locating system including a first multivibrator generating a first series of pulses, a buffer amplifier connected to said first multivibrator, a second multivibrator connected to said buffer amplifier, said second multivibrator representing a frequency dividing circuit reducing the frequency impressed upon it by a factor of four, a filter connected to said second multivibrator tuned to the natural frequency of said second multivibrator, an amplifier connected to the output of said filter, a multigrid mixer tube connected with one control grid to the output of said amplifier and with the other control grid to the output of said buffer amplifier, said mixer tube selecting every fourth pulse generated by said first multivibrator, and a sawtooth generating circuit connected to said mixer tube, said circuit generating a sawtooth wave, the duration of the linear portion of said wave being approximately equal to the time elapsing between the leading edges of the pulses selected by said mixer tube.

4. A radio object-locating system as defined in claim 3, which further includes a keyer and a transmitter, said keyer being connected to the output of said mixer tube, whereby said keyer is controlled by the pulses selected by said tube.

5. A radio object-locating system as defined in claim 3, which further includes a pulse-shaping differentiating network between said mixer tube and said sawtooth generating circuit, said differentiating network transforming the pulses selected by said tube into positive and negative pulses, and connections between said differentiating network and said sawtooth generating circuit for timing said sawtooth generating circuit by means of said positive pulses.

6. A radio object-locating system as defined in claim 3, which further includes a transmitter, a keyer connected to the output of said mixer tube, said tube controlling through said keyer transmission of exploratory pulses by said transmitter, a receiver, and a cathode-ray tube connected to said sweep circuit and said receiver, said transmitter, receiver, and sweep circuit being so constructed and arranged that said cathode-ray tube reproduces on its screen all signals received by said receiver during the intervals of time between said exploratory pulses.

7. A radio object-locating system including a series circuit of a first multivibrator, a first buffer amplifier, a frequency dividing second multivibrator reducing the input frequency in a 4-to-1 ratio, a filter having its parameters adjusted to the natural period of the wave generated by said second multivibrator, a second buffer amplifier, a phase shifter providing 0°, 90°, 180° and 270° phase displacements of the wave appearing in the output of said second buffer amplifier, a four-contact switch, and a multi-grid mixer tube connected to said contact switch with one control grid and to the output of said first buffer amplifier with the other control grid, said mixer tube selecting every fourth pulse generated by said first multivibrator, and means for operating said switch from one contact to the next for making said mixer tube select a pulse generated by said first multivibrator adjacent to the previously selected pulse.

8. A radio object-locating system as defined in claim 7, which further includes a second series circuit of a pulse-shaping network, an amplifier, and a sawtooth generator connected to said mixer tube, said second series circuit being so constructed and arranged that the duration of the linear portion of the sawtooth wave generated by said sawtooth generator approaches the duration of one full period of the wave generated by said first multivibrator.

9. In a radio object-locating system, a range measuring unit including a first shaft, an adjustable resistance network, a calibrated range dial, said network and said dial being rigidly connected to said first shaft, a second shaft, a phase shifter, a commutator segment connected with its conductive segments to said phase shifter, a revolvable arm making contact with said segment and rigidly connected to said second shaft, and intermittent motion means interconnecting said first and second shafts.

10. In a radio object-locating system as defined in claim 9 in which said range-measuring unit further includes a front panel with a slit, and a scanning sector rigidly mounted on said second shaft, said scanning sector being provided with a plurality of scanning openings alignable with said slit and said dial.

11. In a radio object-locating system as defined in claim 9 in which said range-measuring unit and said intermittent motion means further include a driving gear, and a wheel for operating said unit, said driving gear and said wheel being rigidly connected to said first shaft.

12. In a radio object-locating system as defined in claim 9 in which said intermittent motion means comprises Geneva gears, said Geneva gears transferring said revolvable arm from one conductive segment to the next for each revolution of said first shaft.

13. A range-measuring unit including a cylindrical rheostat, an axially-mounted adjustable rheostat arm revolvable through 360°, a phase shifter, a multi-position switch connected to said phase shifter, a plurality of contacts on said switch, and intermittent motion means interconnecting said arm and said switch, said intermittent motion means being so constructed and arranged that said switch is moved from one contact to the next when said rheostat arm is turned so as to make contact with the minimum resistance point and to break contact with the maximum resistance point on said rheostat.

14. A wave-shaping amplifier including first and second vacuum tubes, said tubes each having a cathode, at least one control grid, and a plate; a common cathode resistor connecting the cathodes of said tubes to ground, a source of potential grounded with its negative pole and connected with its positive pole to the plates of said tubes through individual plate resistors, a diode having a plate and a cathode, a resistor and a condenser connecting the cathode of said diode to ground and to the plate of said first tube respectively, a direct, metallic connection between the plate of said diode and the control grid of said second tube, a condenser shunted by a resistance connecting said metallic connection to ground, an input circuit connecting the control grid of said first tube to a source of varying potential, and an output circuit connected to the plate of said second tube.

JAMES R. MOORE.

References Cited in the file of this patent

UNITED STATES PATENTS

| Number | Name | Date |
| --- | --- | --- |
| 2,145,332 | Bedford | Jan. 31, 1939 |
| 2,225,046 | Hunter | Dec. 17, 1940 |
| 2,338,646 | Kessler | Jan. 4, 1944 |
| 2,355,363 | Christaldi | Aug. 8, 1944 |
| 2,403,626 | Wolff | July 9, 1946 |
| 2,405,238 | Seeley | Aug. 6, 1946 |
| 2,408,414 | Donaldson | Oct. 1, 1946 |
| 2,454,782 | De Rosa | Nov. 30, 1948 |
| 2,455,265 | Norgaard | Nov. 30, 1948 |

FOREIGN PATENTS

| Number | Country | Date |
| --- | --- | --- |
| 552,072 | Great Britain | Mar. 22, 1943 |